May 15, 1951  J. COJAN  2,552,938

MEANS FOR SECURING OPTICAL ELEMENTS

Filed Feb. 11, 1948

INVENTOR
Jean Cojan
By: John H. Graham
HIS AGENT.

Patented May 15, 1951

2,552,938

UNITED STATES PATENT OFFICE 2,552,938

MEANS FOR SECURING OPTICAL ELEMENTS

Jean Cojan, Bourg La Reine, France

Application February 11, 1948, Serial No. 7,695
In France February 6, 1947

Section 1, Public Law 690, August 8, 1946
Patent expires February 6, 1967

3 Claims. (Cl. 88—1)

This invention relates to improvements in means for securing optical elements, such as prisms, in the desired locations therefor.

While it is easy enough, as a rule, to secure lenses in optical instruments since lenses are circular in shape, the attachment of prisms is not nearly so simple and this also applies to other non-rotatable optical pieces. These pieces must be held in their frames without play or such strain as may cause danger of breaking of the glass of the prism.

The hypotenuse surface of a prism is fixed usually on a seating. A spring keeps it pressed against this seating surface and it is prevented from moving sideways, after it is adjusted in position, by small bars fastened by screws, the holes in the bars through which go the screws, give enough play for adjustment of the prism. This bulky arrangement is not always practicable and, the screws may become loose. Another method is to mount the prism on its seating and leave a free space all round it. After the prism is adjusted, a liquid plastic solution is poured in the clearance existing around the prism. After the plastic sets or after evaporation of the solvent, the prism is fixed in position. This method is convenient enough but there remains in the set plaster or solution a certain amount of moisture or solvent that condenses as vapour on the glass surfaces after the instrument is closed. In still another method the prism is mounted on its seating plane where it can only change its position lengthwise and is set in place by forcing a small portion of the metal of the frame into grooves cut in the side of the prism. This method may only be adapted if the metal of the frame is plastic enough for the purpose.

The object of the present invention is to provide a method and means for attaching prisms which eliminates the drawbacks in the methods now in current use. Its principle lies in the production of a means for locking prisms in place, in their seating plane, by means of a small fragment of easily melted or plastic metal inserted in the grooves of the prism and in the frame itself or in a portion that is rigid with the frame.

The accompanying drawings illustrate two ways of carrying out the invention.

Figure 1:
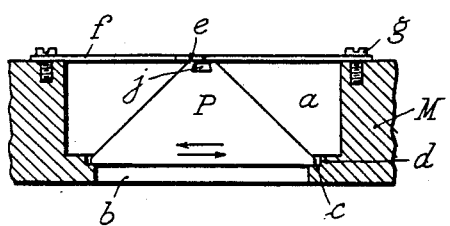
Figure 2:
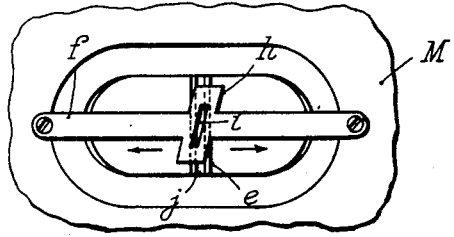

Fig. 1 shows in vertical section and Fig. 2 in a plan view one way of carrying out the invention.

Referring to the drawings it will be noted in Figs. 1 and 2 frame M in which the prism P is mounted, comprises a hollowed out portion $a$ which is slightly wider and longer than the base of the prism, and a slightly narrower aperture $d$ portion $b$. The edge of the base of the prism rests on a step forming the seating plane $c$. The width of the notch $d$ defining said plane is the same as that of the prism while it has a slightly greater length. The position of the prism, therefore, may be changed to a slight extent in opposite directions as shown by the arrows to allow of its adjustment.

The top of the prism has been cut off so as to provide a small flat surface $e$ on which bears a flexible blade $f$ secured to the frame M, as by screws $g$.

The middle portion of blade $f$ is formed with a cross-piece $h$ arranged at an oblique angle, and which rests on the cut-off portion $e$ of the prism. An elongated aperture $i$ is provided in cross-piece $h$. The flat portion $e$ of the prism P is provided with a groove $j$ of rectangular cross section or in the form of a dove-tail or other suitable shape. The edges of this groove may be straight-lined or otherwise depending on the circumstances.

As is shown in Fig. 2 aperture $i$ and the groove $j$ lie at a certain angle with respect to each other.

To set the prism in place, once its desired position has been adjusted, a drop of molten metallic alloy is poured into the aperture $i$. The alloy enters groove $j$ and sets at once thus interlocking the two pieces together and fixing the prism in place.

Instead of dropping in molten alloy, the metal may be introduced in the shape of strips, in small pieces, or in powder form, and then melted, as by an electric soldering iron.

Also, instead of using an easily melted alloy, a fragment of malleable metal may be employed; in this case, the metal is forced simultaneously into the slot $i$ and the groove $j$ of the prism.

The alloy employed should have a suitable fusion or softening point and expand on setting to ensure a secure holding without danger of play.

The spring piece $f$ may be replaced by a stiff piece with the introduction of some flexible medium such as cork, paper, etc.

In the example illustrated, the groove $e$ of the prism P is located on the top of the prism but obviously it may be provided at any other suitable point.

Any standard metal or alloy having the correct degree of malleability may be used for this purpose; the frame M may be of any material, but more particularly of a plastic substance. The grooves $e$ and $j$ may be much wider and deeper than the usual mechanical settings, and this is an extra safeguard for the secure fastening of the prism.

Thus, the invention provides means whereby a prism may be fastened easily, quickly and firmly in its frame, no matter what the material of the latter may be.

The scheme as illustrated in Figs. 1 and 2 offers the additional advantage of easy fastening when the portion of the prism close to the seating plane is not readily accessible.

The arrangements referred to above are given only as examples and there may be a wide range of modifications in all details of performance, shapes, sizes and materials used without any alteration of the invention as defined in accompanying claims.

What I claim is:

1. Means for securing an optical prism in a support, comprising in combination, a seat for the prism in the support, said seat being slightly wider than the base of the prism, a plane face formed at the apex of the prism, a groove extending parallel with said apex and along said face, a fixing band secured to said support extending across said seat above and at right angles to said groove, a slot in said band extending at an angle other than a right angle to said groove and a securing element extending into both said slot and said groove.

2. The combination of claim 1, in which the said securing element is a metallic fusible member and is fused in situ.

3. The combination of claim 1, in which the securing element is a malleable metallic member and is wedged in both the slot and the groove.

JEAN COJAN.

REFERENCES CITED

The following references are of record in the file of this patent:

UNITED STATES PATENTS

| Number | Name | Date |
| --- | --- | --- |
| 1,037,505 | Mechbach | Sept. 3, 1912 |
| 2,364,768 | Aitcheson | Dec. 12, 1944 |
| 2,437,947 | Falkoff | Mar. 16, 1948 |

FOREIGN PATENTS

| Number | Country | Date |
| --- | --- | --- |
| 52,537 | Austria | Mar. 11, 1912 |
| 286,273 | Germany | July 29, 1915 |